United States Patent

Low

[11] Patent Number: 5,251,655
[45] Date of Patent: Oct. 12, 1993

[54] FLOW CONTROL VALVES FOR POST-MIX BEVERAGE DISPENSERS

[75] Inventor: Michael Low, Norcross, Ga.
[73] Assignee: Wilshire Partners, Cleveland, Ohio
[21] Appl. No.: 913,882
[22] Filed: Jul. 6, 1992
[51] Int. Cl.$^5$ .................................................. G05D 7/01
[52] U.S. Cl. ................................. 137/501; 137/504; 251/337
[58] Field of Search ............... 137/501, 504; 251/337

[56] References Cited

U.S. PATENT DOCUMENTS

| | | | |
|---|---|---|---|
| 2,152,695 | 4/1939 | Hornschuch | 137/504 X |
| 2,262,083 | 11/1941 | Ziets | 251/144 |
| 2,887,123 | 5/1959 | Becker | 137/505.11 |
| 2,984,261 | 5/1961 | Kates | 138/46 |
| 3,121,373 | 2/1964 | Murphy et al. | 92/95 |
| 3,140,126 | 7/1964 | Elliott | 303/84 |
| 3,151,628 | 10/1964 | Heckert | 137/500 |
| 3,244,399 | 5/1966 | Jones et al. | 251/327 |
| 3,253,611 | 5/1966 | Cummins | 137/338 |
| 3,464,439 | 9/1969 | Budzich | 137/504 |
| 3,625,402 | 12/1971 | Kuils | 222/129.3 |
| 3,653,548 | 4/1972 | Kotscha et al. | 222/129.1 |
| 3,854,497 | 12/1974 | Rosenburg | 137/504 X |
| 3,966,091 | 6/1976 | Bencic | 222/129.1 |
| 4,074,693 | 2/1978 | Kates | 137/454.6 |
| 4,266,726 | 5/1981 | Brown et al. | 239/406 |
| 4,648,423 | 3/1987 | Henken | 137/494 |
| 4,648,424 | 3/1987 | Takahashi et al. | 137/504 |
| 4,700,746 | 10/1987 | Barb | 137/625.28 |
| 4,998,707 | 3/1991 | Meyer et al. | 251/129.15 |

Primary Examiner—Stephen M. Hepperle
Attorney, Agent, or Firm—Body, Vickers & Daniels

[57] ABSTRACT

Adjustable flow control valves are disclosed for controlling the flow of syrups and diluents at a corresponding predetermined constant flow rate regardless of the pressure of the fluid being controlled. The valves include a cylinder and piston assembly in which the piston has an inlet orifice and controls outlet ports from the cylinder to maintain a constant flow rate. Dual spring arrangements provide for adjusting the range of flow rates which the valve can accommodate in connection with varying pressure and varying viscosity of the liquid being controlled, and variable piston orifice arrangements are disclosed for the same purpose. An improved cylinder construction comprising sleeve and bonnet components is disclosed and provides for the outlet ports from the cylinder to be provided in the bonnet component.

40 Claims, 7 Drawing Sheets

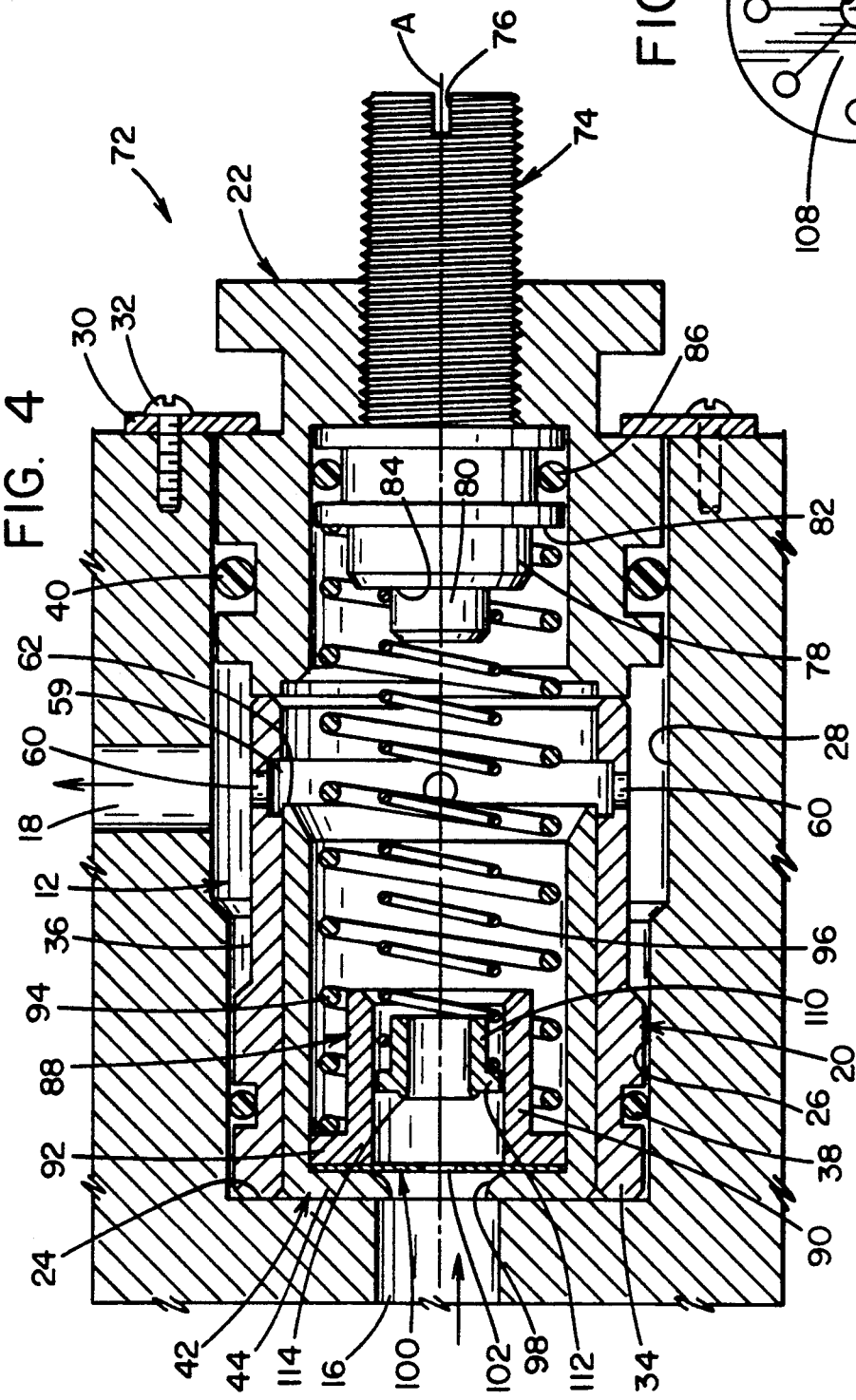

FLOW CONTROL VALVES FOR POST-MIX BEVERAGE DISPENSERS

BACKGROUND OF THE INVENTION

This invention relates to the art of post-mix beverage dispensers and, more particularly, to improved valves for obtaining a constant flow rate with respect to diluents and syrups which are mixed to produce the beverage to be dispensed. Post-mix beverage dispensers are of course well known and, generally, are basically of the structure and operation shown in U.S. Pat. No. 4,266,726 to Brown et al, the disclosure of which is incorporated herein by reference for background purposes. In a post-mix dispenser of the foregoing character, a diluent such as soda water and a syrup flow into the body of the dispenser through separate inlet passageways and across corresponding flow rate control valves toward a mixing area which is generally associated with the nozzle of the dispenser. Flow through the nozzle is generally controlled by a pair of solenoid valves, one for each of the liquids. A drink is dispensed by pressing a receptacle such as a cup against a control lever adjacent the dispensing nozzle which actuates a microswitch which in turn actuates the solenoid valves simultaneously for the diluent and syrup to flow into and through the nozzle and into the receptacle. The syrup and diluent are fed to the inlet ends of the flow passageways from separate sources under pressure and, upon opening of the solenoid valves, the liquids flows through the corresponding flow rate control valve to the dispensing nozzle.

It is of course well known that in post-mix beverage dispensers, the flow rates of the diluent and syrup streams must be regulated so that the finished drink contains the proper ratio of diluent to syrup. The pressures of the diluent, which is most often soda water, and the syrup vary with respect to time and temperature and, therefore, the valves which control the soda water and syrup flow rates must be able to provide a constant flow rate for the corresponding liquid under varying pressure conditions. In addition to being operable under varying pressure conditions, it is also desirable to provide for the flow rate controlling valves to be operable at a variety of different flow rates. As is also well known, the viscosity of soda water is lower than that of the syrups to be mixed therewith in forming a beverage and, with respect to syrups, syrups for diet drinks are of a lower viscosity than those for regular or non-diet drinks. It will be appreciated, therefore, that the valves controlling the soda water and syrup flow rates have to be operable with liquids of different viscosity.

One type of flow rate controlling valve heretofore employed in connection with post-mix dispensers is shown in the aforementioned patent to Brown et al and, basically, comprises a spring biased piston reciprocable in a cylinder assembly and having an orifice through which the liquid flows into the cylinder assembly. The cylinder assembly has outlet ports adjacent the inner end of the piston and which are controlled by displacement of the piston in the cylinder. More particularly in this respect, liquid under pressure flows through the orifice and, above a predetermined pressure, displaces the piston against the biasing spring force. As the pressure of the liquid increases and decreases relative to the predetermined pressure, the piston will respectively decrease and increase the size of the outlet ports, thus to maintain a constant flow rate under variable pressure conditions. While flow control valves of this character serve their intended purpose, the range of operation thereof with respect to providing a variety of flow rates and liquid viscosity ranges under which they are operable is limited by the size of the orifice in the piston, the adjustability of the spring force and the stroke of the piston with respect to controlling the outlet ports of the valve. Accordingly, it is very difficult to provide one valve configuration which will regulate liquid flow accurately over both a desired flow rate and viscosity range. Thus, separate flow control valve configurations with respect to piston orifice, spring force and outlet port size have been required to obtain desired flow rates for given liquid viscosities and pressure variations. The necessity of providing a variety of flow rate control valve configurations is of course expensive and inconvenient and, at least partially in this respect, requires maintaining a rather large inventory of component parts which are appropriately identified to assure assembly of the appropriate parts to provide a valve having the desired flow rate controlling capability.

Another disadvantage in conjunction with flow rate controlling valves of the piston-cylinder type referred to above resides in the fact that the cylinder assembly is defined by coaxial sleeve and bonnet components including an accurately machined metal sleeve in which the piston is reciprocable and which includes the outlet ports controlled by the piston during operation of the valve. The bonnet supports a spring adjusting device by which the spring force against the piston is adjustable, and the bonnet also serves in conjunction with an appropriate retainer to removably secure the valve in an opening therefor in the dispenser body. In order for the valve to accommodate different flow rates and liquid viscosities, the machined sleeves are provided with different sized outlet ports, thus requiring a high inventory of sleeves to enable the assembly of valves having a variety of flow rate and viscosity handling capabilities. Again, this requirement adds to the manufacturing and maintenance costs in connection with post-mix dispensers.

SUMMARY OF THE INVENTION

In accordance with the present invention, improved flow rate controlling valve structures are provided which advantageously enable accurately regulating the flow rate of a post-mix beverage dispenser liquid over wider flow rate and viscosity ranges than heretofore possible. More particularly in this respect, a flow rate controlling valve in accordance with the present invention provides selectivity with respect to modifying the area of the piston orifice and/or modifying the spring rate with respect to biasing the piston, thus enabling the valve to operate over a variety of flow rates and liquid viscosity ranges. Therefore, for example, the valve is operable in one mode of selective adjustment to provide a range of low flow rates in connection with low viscosity liquids, and in a second mode of adjustment to provide a range of higher flow rates in connection with high viscosity liquids. In accordance with one aspect of the invention, such a dual mode of operation is achieved by varying the area of the piston orifice and the spring force of the piston biasing spring in accordance with the desired low flow rate-low viscosity or high flow rate-high viscosity operating conditions. In accordance with another aspect of the invention, the dual mode of operation is achieved through the use of a pair of piston biasing compression springs, only one of which is operable in the low flow rate-low viscosity mode and both of which are operable in tandem in the high flow rate-high viscosity mode of operation. In accordance with yet another aspect of the invention, the flow rate and liquid viscosity ranges are increased by providing the dual spring configuration with the capability of modifying the area of the orifice through the piston in connection with operating the valve in the high flow rate-high viscosity mode.

In connection with any of the foregoing embodiments, a single valve construction is provided which advantageously provides selectivity with respect to adjusting the valve to accommodate both high and low flow rates with both high and low viscosity liquids, thus increasing the flow rate and viscosity ranges that a single valve configuration can operate within in comparison with flow rate controlling valves heretofore provided in conjunction with post-mix beverage dispensers. This advantageously reduces the manufacturing costs and inventory costs with respect to the marketing and maintenance of post-mix beverage dispensers by eliminating the requirement for multiple valve configurations in order to accommodate the same range of flow rates and liquid viscosities as the valves according to the present invention.

In accordance with yet another aspect of the present invention, applicable to the dual mode operating valves referred to hereinabove, the cylinder assembly for the valve is modified to provide for the outlet ports to be through the bonnet rather than the sleeve in which the piston reciprocates. This advantageously simplifies the manufacture of the sleeve and provides a single sleeve design for both low and high viscosity liquids by which considerable cost reduction is realized. Moreover, a wider selectivity of outlet port shape and size is available by providing for the outlet ports to be defined by recesses in the end of the bonnet and the abutting edge of the sleeve. The bonnet does not require the precision machining which is required with respect to the piston and sleeve components, whereby considerable savings in both production time and production cost is realized by providing the outlet ports in the bonnet component.

It is accordingly an outstanding object of the present invention to provide improved valve constructions for obtaining a constant flow rate for liquids in a post-mix beverage dispenser.

Another object is the provision of flow control valves of the foregoing character which accommodate a wider range of liquid viscosities and provide a wider range of flow rates than heretofore possible.

A further object is the provision of flow control valves of the foregoing character which are selectively adjustable to provide for operation at low flow rate-low liquid viscosity and at high flow rate-high liquid viscosity.

Yet a further object is the provision of flow control valves of the foregoing character having selectable adjustments providing for a variable inlet orifice area and/or variable spring rate in conjunction with obtaining low flow rate-low viscosity and high flow rate-high viscosity valve operation.

Still another object is the provision of flow rate control valves of the foregoing character which eliminate the need for two or more structurally different valve assemblies to achieve the accurate control of the flow rate over a flow rate range with both low viscosity and high viscosity liquids.

Still another object is the provision of an improved cylinder arrangement for a spring biased piston-type flow regulating valve for use in post-mix beverage dispensers.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 4 is a sectional elevation view showing a further embodiment of a flow rate controlling valve in accordance with the present invention;

FIG. 5 is a plan view of the orifice plate for the valve shown in FIG. 4;

DESCRIPTION OF PREFERRED EMBODIMENTS

Figure 1:
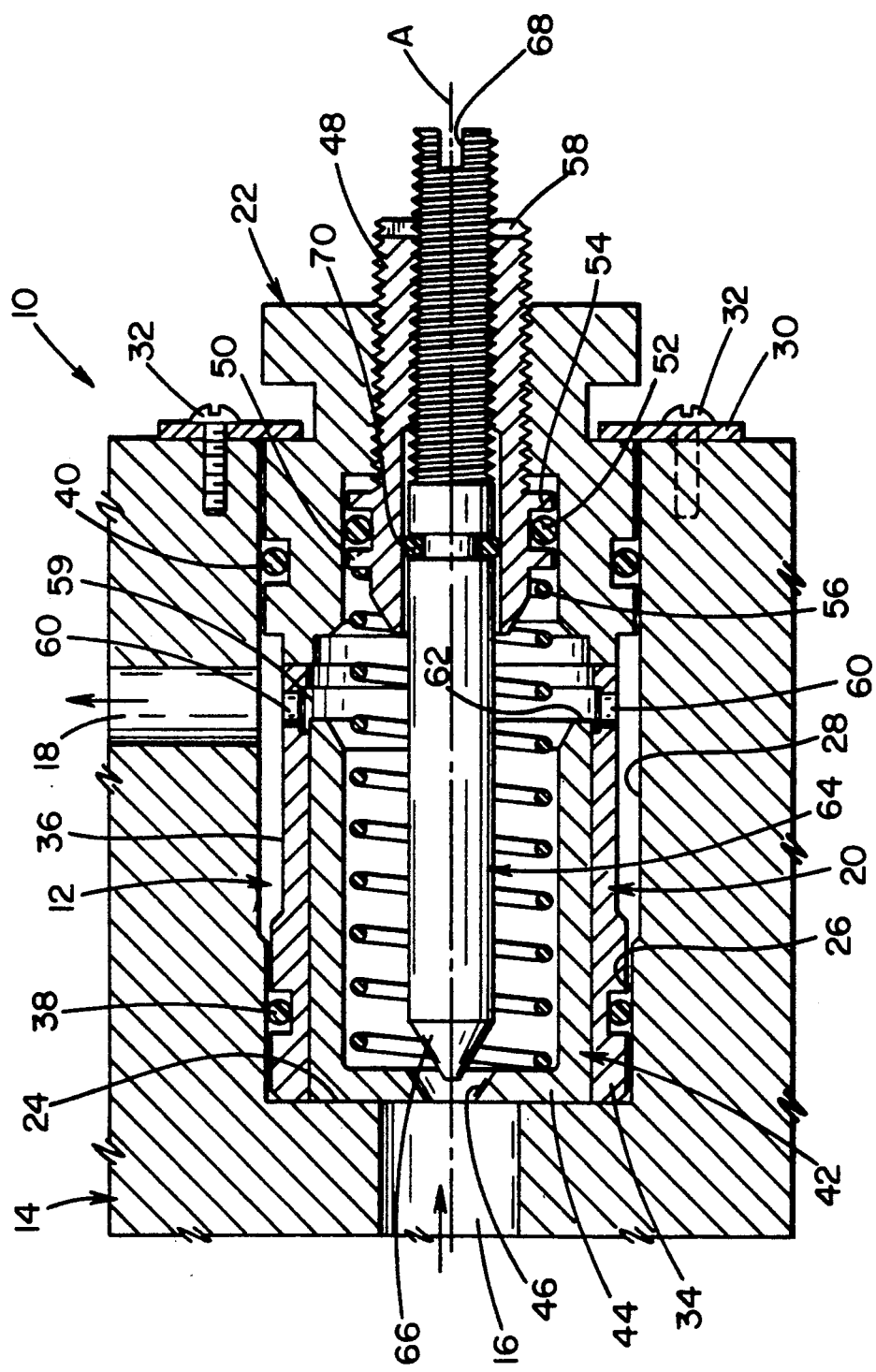
FIG. 1 is a sectional elevation view of a flow rate controlling valve in accordance with the present invention.

Referring now in greater detail to the drawings wherein the showings are for the purpose of illustrating preferred embodiments of the invention only, and not for the purpose of limiting the invention, FIG. 1 illustrates a flow rate controlling valve 10, the structure of which enables the valve to accurately control, at a constant flow rate, either a diluent such as soda water or a low viscosity or high viscosity syrup in a post-mix beverage dispenser. In a manner well known, valve 10 is removably mounted in a chamber 12 provided therefor in body 14 of a liquid dispenser and which chamber has an inlet end defined by an inlet passage 16 in body member 14. As is well known, inlet passage 16 is adapted to be connected to a source of soda water or syrup under pressure, not shown. As is likewise well known, chamber 12 includes an outlet passage 18 by which liquid flowing through valve 10 is directed to the corresponding solenoid control valve of the dispenser by which dispensing of the liquid into a cup or the like is controlled.

Chamber 12 has an axis A, and valve 10 includes a cylinder assembly coaxial with axis A and defined by axially abutting sleeve and bonnet members 20 and 22, respectively. Chamber 12 has an axially inner wall 24, an inner chamber portion 26 and a radially outwardly stepped outer chamber portion 28, and the cylinder assembly is axially retained in chamber 12 by a suitable retaining plate 30 attached to body 14 by threaded fasteners 32. Sleeve 20 includes an inner end 34 snugly received in chamber portion 26, and a radially inwardly stepped portion 36 which, together with chamber portion 28, provides an annular passageway about sleeve 20 in flow communication with outlet passage 18. O-rings 38 and 40 sealingly interengage sleeve 20 and bonnet 22 with corresponding portions of chamber 12. Valve 10 further includes a cup-shaped piston member 42 having an end wall 44 adjacent chamber end wall 24 and provided with an orifice 46 which diverges inwardly of the piston relative to axis A. Bonnet member 22 supports an externally threaded spring adjusting sleeve 48 having a spring abutment collar 50 on the inner end thereof, and spring adjusting sleeve 48 and bonnet 22 are sealed against the leakage of liquid therebetween by an O-ring 52 interposed between abutment collar 50 and an O-ring retaining collar 54. A piston biasing compression spring 56 is interposed between the inner side of piston end wall 44 and abutment collar 50, and the spring force is adapted to be adjusted by rotating sleeve 48 relative to bonnet 22. The outer end of sleeve 48 is provided with a diametrically extending slot 58 adapted to receive an appropriate tool for the latter purpose.

The axially inner end of sleeve 20 is in abutting engagement with the axially inner end of bonnet 22, and sleeve 20 is provided adjacent the axial inner end thereof with a peripheral recess 59 and a plurality of outlet ports 60 which open into chamber portion 28. As is well known in connection with such flow rate controlling valves as thus far described, liquid under pressure in inlet 16 to chamber 12 flows through piston orifice 46 into the cylinder assembly of the valve and thence into recess 59 and through outlet ports 60 to chamber portion 28 and outlet passage 18. Piston orifice 46 is sized and biasing spring 56 is adjusted for the force thereof to bias the piston against chamber end wall 24 to provide for a constant flow rate of liquid through the valve at a predetermined liquid pressure. When the pressure increases above the predetermined level, piston 42 is displaced to the right in FIG. 1 against the bias of spring 56 and the axially inner end edge 62 of the piston progressively decreases the area of recess 59 and outlet ports 60 so as to decrease the rate of liquid flow to outlet passageway 18. In response to the decrease of the liquid pressure, piston 42 is biased to the left in FIG. 1 by spring 56 so as to increase the area of recess 59 and outlet ports 60 and thus increase the rate of liquid flow to outlet passageway 18. Accordingly, variation in liquid pressure are overcome to provide a substantially constant flow rate of the liquid through the valve.

The flow rate range for the valve as thus far described is adjustable to a limited extent by varying the biasing force of spring 56. The adjustability is limited by the size of piston orifice 46 and the spring rate of biasing spring 56. In accordance with the present invention, the range of flow rate adjustability is increased by providing an arrangement for selectively adjusting the size of the piston orifice in addition to adjusting the spring force. More particularly in this respect, an orifice adjusting pin 64 is mounted in spring adjusting sleeve 48 coaxial with axis A and is provided with a conically shaped inner end corresponding in contour with the contour of piston orifice 46. Spring adjusting sleeve 48 is internally threaded, and the corresponding end of pin 64 is externally threaded whereby rotation of pin 64 relative to sleeve 48 is adapted to displace end 66 axially toward and away from piston orifice 46. The outer end of pin 64 is provided with a diametrically extending slot 68 for this purpose, and an O-ring seal 70 is interposed between pin 64 and spring adjusting sleeve 48 to preclude the leakage of liquid therebetween.

With respect to increasing the flow rate range, it will be appreciated that orifice adjusting pin 64 can be displaced to the right in FIG. 1 away from piston orifice 46 so as to have no effect with respect to varying the size thereof, and that the force of spring 56 can be adjusted through spring adjusting sleeve 48 so that the valve is operable through a first range of flow rates. This range of flow rates is then adapted to be increased by adjusting orifice pin 64 to the left in FIG. 1 toward piston orifice 46 so as to decrease the effective area thereof and by adjusting spring 56 to increase the biasing force thereof against piston 42. These adjustment capabilities provide for the valve to operate over a variety of flow rates with low viscosity liquid such as soda water and with high viscosity syrups including those for diet beverages and the higher viscosity sugar syrups for regular or non-diet beverages.

Figure 2:
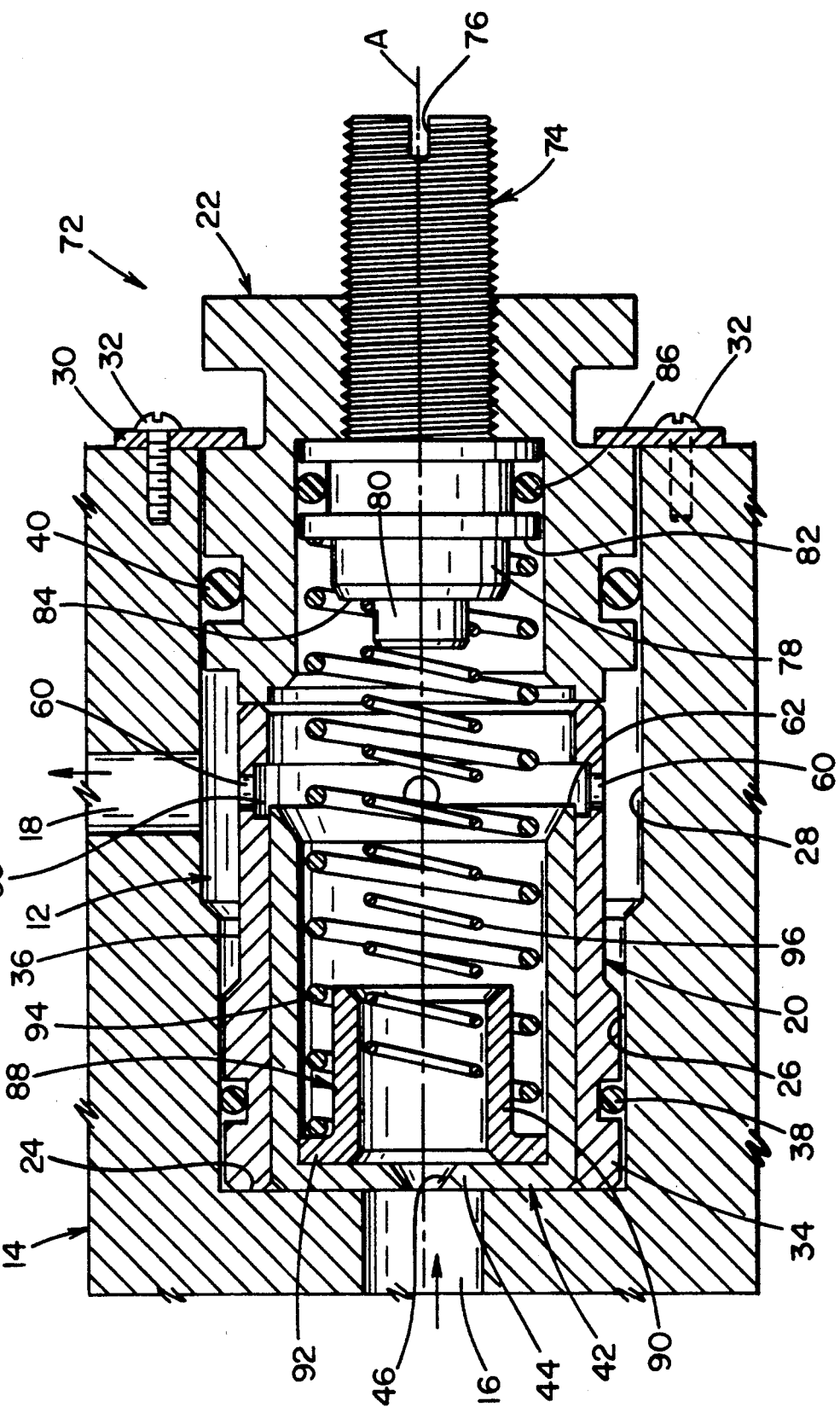
FIG. 2 is a sectional elevation view of another embodiment of a flow rate controlling valve in accordance with the present invention and showing the valve in a first mode of adjustment.
Figure 3:
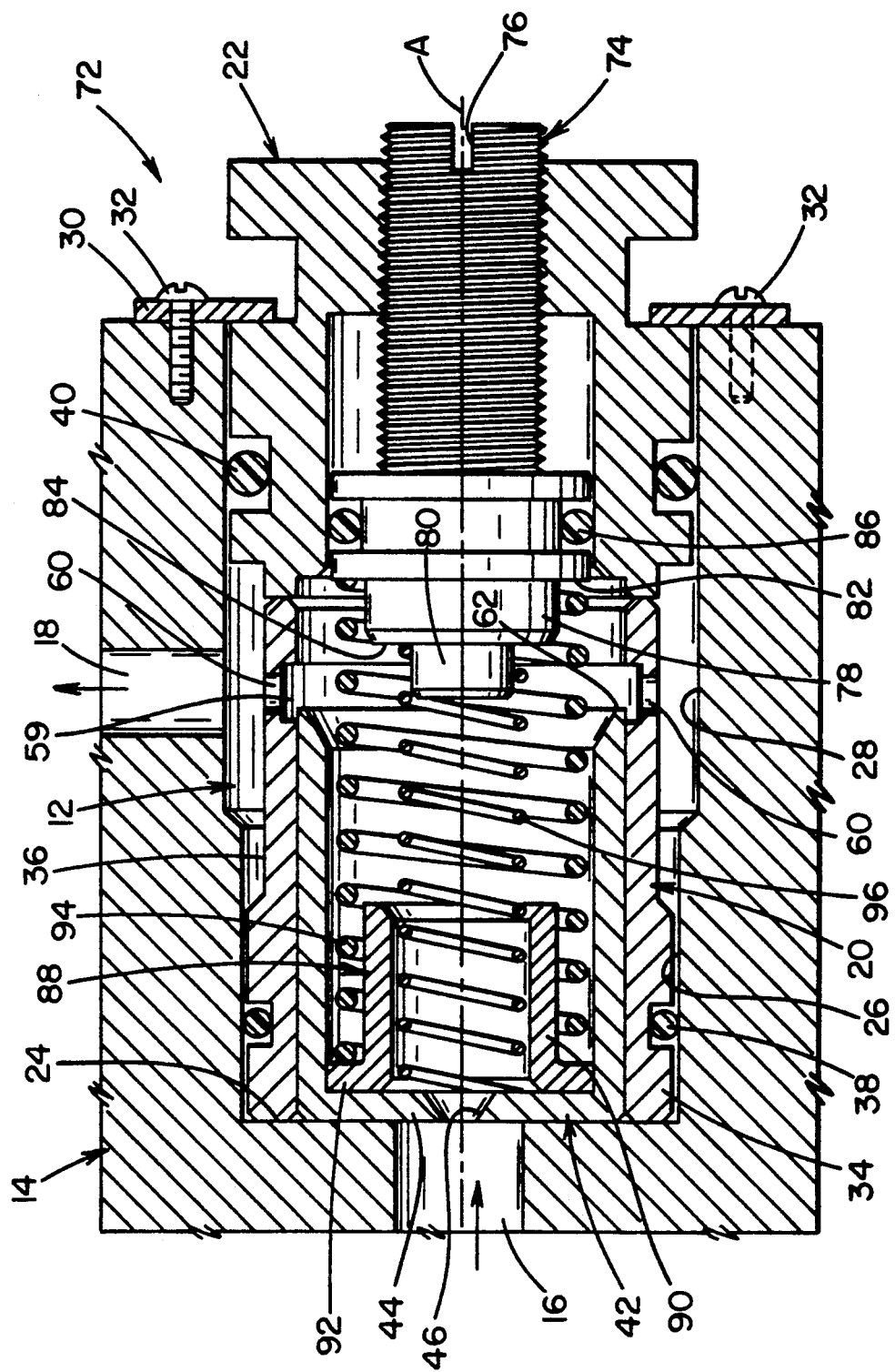
FIG. 3 is a sectional elevation view of the valve illustrated in FIG. 2 and showing the valve in the second mode of adjustment.

Another flow rate controlling valve having selectable adjustments providing for the valve to operate over a variety of flow rates and liquid viscosity ranges is illustrated in FIGS. 2 and 3 of the drawing. Certain of the component parts in this embodiment correspond to those of the embodiment illustrated in FIG. 1 and, accordingly, are designated by like numerals in FIGS. 2 and 3. The flow rate controlling valve 72 of the embodiment shown in the latter figures includes a spring adjusting screw 74 coaxial with axis A and the outer end of which is externally threaded and threadedly interengaged with a threaded opening therefor in bonnet 22. Accordingly, the spring adjusting screw is axially displaceable toward and away from piston 42, and the outermost end of the adjusting screw is provided with a diametrically extending slot 76 to facilitate rotation thereof such as by a screwdriver.

The inner end of spring adjusting screw 74 is provided with axially stepped first and second nodes 78 and 80, respectively, which respectively provide first and second spring abutment shoulders 82 and 84. The spring adjusting screw and bonnet 22 are sealed against leakage therebetween by means of an O-ring 86. A tubular spring guide 88 is disposed within piston 42 and includes a sleeve portion 90 coaxial with axis A and a flange 92 extending radially outwardly therefrom and engaging against the inner side of end wall 44 of piston 42. A first compression spring 94 has one end thereof surrounding node 78 and abutting shoulder 82 and its opposite end surrounding sleeve 90 of guide 88 and abutting against the inner side of flange 92 thereof. A second compression spring 96 has one end thereof surrounding node 80 and abutting shoulder 84 of adjusting screw 74 and has its opposite end received within sleeve 90 of guide 88. In the position of the component parts shown in FIG. 2, and for the purpose set forth more fully hereinafter, the end of spring 96 received in sleeve 90 of guide 88 is axially spaced from the inner side of end wall 44 of piston 42. Springs 94 and 96 are coaxial with axis A, and the nodes on spring adjusting screw 74 and the outer and inner sides of sleeve 90 of guide 88 serve to maintain the springs in coaxial relationship.

When the component parts are in the positions thereof shown in FIG. 2, first spring 94 is compression between spring adjusting screw 74 and piston 42 and is adapted to be adjusted axially to the extent that the floating end of spring 96 in sleeve 90 of guide 88 does not contact the inner side of end wall 44 of piston 42. Thus, the valve operates under the spring rate of spring 94 only and is adjustable to provide a variety of flow rates for soda water and the low viscosity diet syrups.

The flow rate and viscosity ranges are adapted to be selectively increased by displacing spring adjusting screw 74 to the position shown in FIG. 3 of the drawing and in which second compression spring 96 is compressed between shoulder 84 and the inner side of end wall 44 of piston 42, whereby the two springs are compressed to enable operation of the valve with the combined spring rate of both springs. In this mode of adjustment, the valve is operable at higher flow rates and with the higher viscosity syrups for regular or non-diet beverages. It will be appreciated, of course, that the valve operates as described hereinabove in connection with maintaining a desired flow rate therethrough. In this respect, in either of the modes of adjustment, the spring biasing force is adjusted to obtain the desired flow rate through the valve at a predetermined pressure and, in response to the pressure increasing above the predetermined level, piston 42 is displaced to the right in either FIG. 2 or 3 to progressively reduce the size of the outlet ports 60 so as to maintain the desired flow rate.

Figure 6:
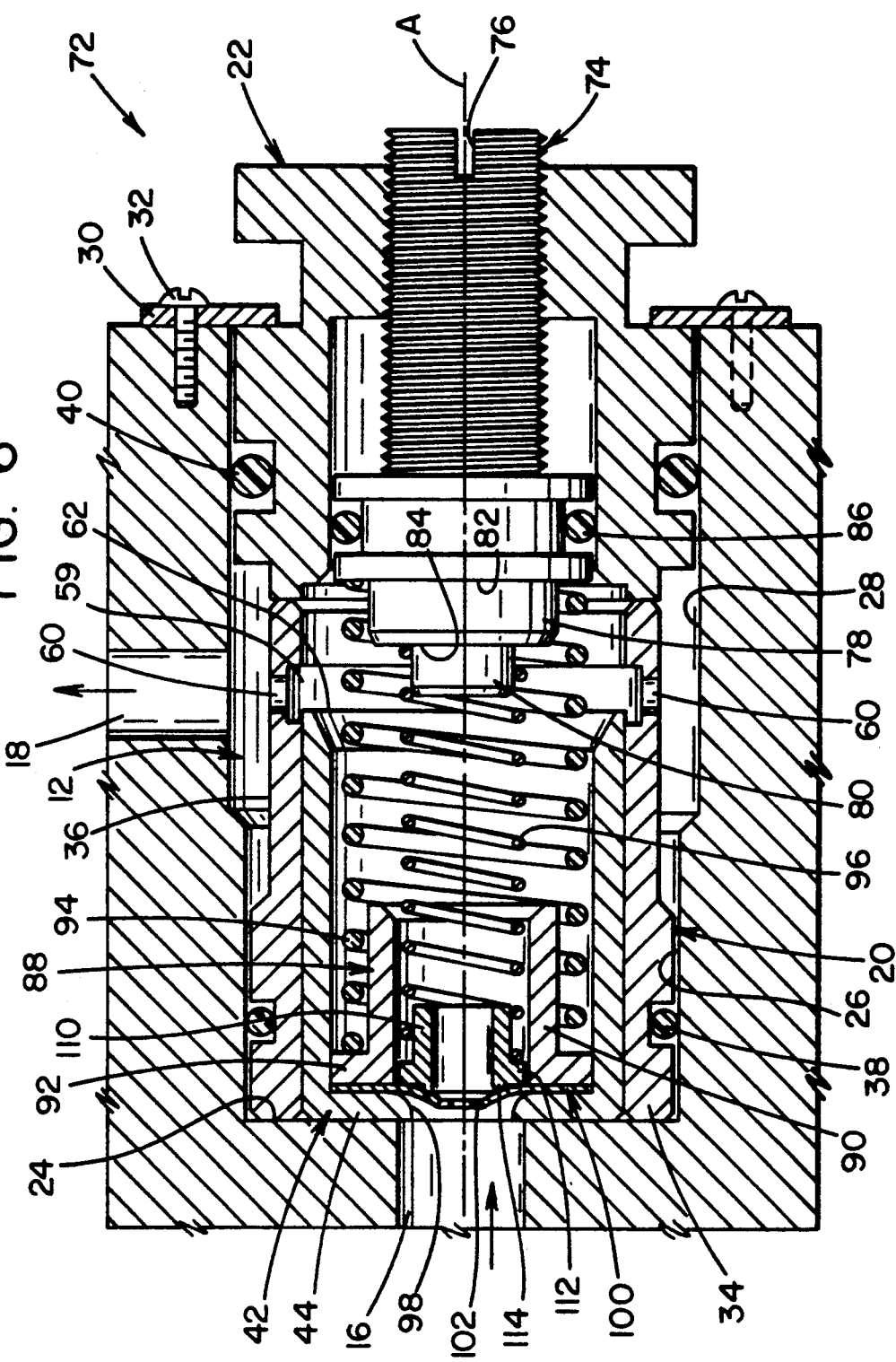
FIG. 6 is a sectional elevation view of the valve illustrated in FIG. 4 and showing the valve in a second mode of adjustment.

FIGS. 4–6 illustrate a modification of the valve shown in FIGS. 2 and 3 and by which the flow rate and viscosity ranges of the valve are further increased. Again, like numerals are used in FIGS. 4–6 to designate parts corresponding to those of the previous embodiments. In the embodiment shown in FIGS. 4–6, the flow rate controlling valve 72 of FIGS. 2 and 3 is modified by providing end wall 44 of piston 42 with an enlarged opening 98 in place of orifice 46, and by providing an orifice plate 100 between the inner side of end wall 44 of the piston and flange 92 of guide 88. Orifice plate 100, which is best seen in FIG. 5, is an annular disk of thin sheet metal, preferably stainless steel having a thickness of about 0.005 inch or 5 mil. Orifice plate 100 is provided with an orifice 102 which is coaxial with axis A and a plurality of slits 104 extending radially outwardly from orifice 102 and equally spaced apart circumferentially thereof. Preferably, the plate is provided with eight slits extending radially at an angle of 45° to one another and each of which terminates in a corresponding stress relief hole 106 which protects against tearing of the orifice plate material radially outwardly of the ends of the slits. Slits 104 divide the orifice plate into a plurality of orifice plate fingers 108 which are adapted to be deflected axially of axis A to increase the area of orifice 102 as set forth more fully hereinafter.

It will be appreciated that orifice plate 100 is clamped in place between piston end wall 44 and flange 92 of guide member 88 by the outer compression spring 94. The free end of inner spring 96 which extends into sleeve 90 of guide member 88 is provided with an orifice plate deflector member having a sleeve portion 110 received within the end of spring 96 and a flange 112 extending radially outwardly from sleeve 110 and abutting against the end of spring 96. The axially outer end of the orifice plate deflecting member is provided with an annular rib 114 extending axially outwardly of flange 112 and having a diameter slightly greater than that of orifice 102 in orifice plate 100. When the component parts are in the positions thereof shown in FIG. 4, the valve is operable as described hereinabove in connection with the valve shown in FIG. 2. When the spring adjusting screw 74 is displaced to the position shown in FIG. 6, which corresponds to the positions of the component parts shown in FIG. 3, the compression of inner spring 96 biases the orifice plate deflecting member axially against the inner side of fingers 108 of orifice plate 100, whereby the latter are deflected axially outwardly to the positions shown in FIG. 6, thus to increase the area of the orifice. Accordingly, in addition to the flow control valve operating with the combined spring rate of both springs 94 and 96 as described hereinabove with regard to FIG. 3, the second mode of adjustment in connection with the valve shown in FIGS. 4 and 6 advantageously provides for enlarging the orifice and thus increasing the flow rate and viscosity ranges with respect to which the valve is operable.

It will be noted that in each of the embodiments illustrated and described herein the cylinder assembly for the valve is defined by sleeve 20 and bonnet 22 having abutting axially inner ends, and that the outlet passage from the cylinder assembly for liquid flowing through the valve is provided by annular recess 59 in the inner surface of sleeve 20 and radial ports 60 through the sleeve, both of which recess and ports are spaced from the axially inner end of the sleeve. The sleeve and piston of the valve are precision items with close tolerances as a result of the required sliding interrelationship therebetween, and the cost of the sleeve is increased by having to machine the outlet recess therein and provide the radial ports therethrough. Furthermore, in connection with piston type flow rate controlling valves which do not have the adjustment capabilities described hereinabove with regard to the valves of the present invention, the radial ports through the sleeve have to be differently sized for valves controlling the flow of soda water and valves controlling the flow of syrups. Accordingly, different sleeves are required in accordance with the required operating conditions for the valve.

In accordance with another aspect of the present invention, the cylinder assembly for piston-type flow rate controlling valves, including those described hereinabove, is modified to provide for the outlet passage as defined by the recess and radial ports to be at the axially inner end of the bonnet component wherein the requirements for precision are not as great as that of the sleeve. This advantageously enables a single sleeve configuration to be used for all valves, reduces the cost of the sleeve and, in those instances where different size radial ports are required provides for the latter to be accommodated by different bonnets which is a less expensive item than the sleeve and thus provides an overall cost reduction in connection with the valve.

Figure 7:
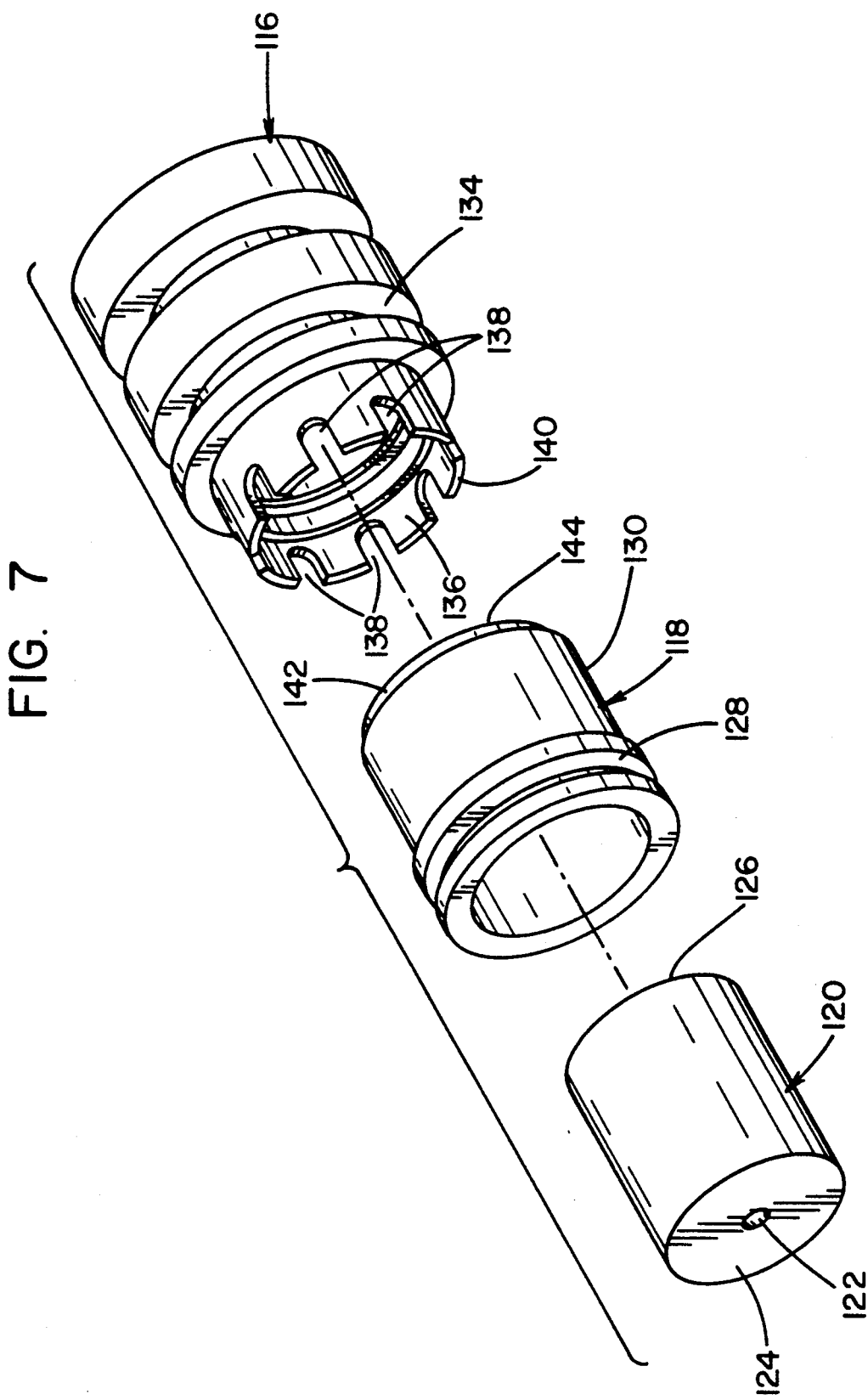
FIG. 7 is an exploded perspective view of the component parts of a modified cylinder assembly for the pistontype flow rate controlling valves; and, FIG. 8 is a sectional elevation view of the assembled parts shown in FIG. 7.
Figure 8:
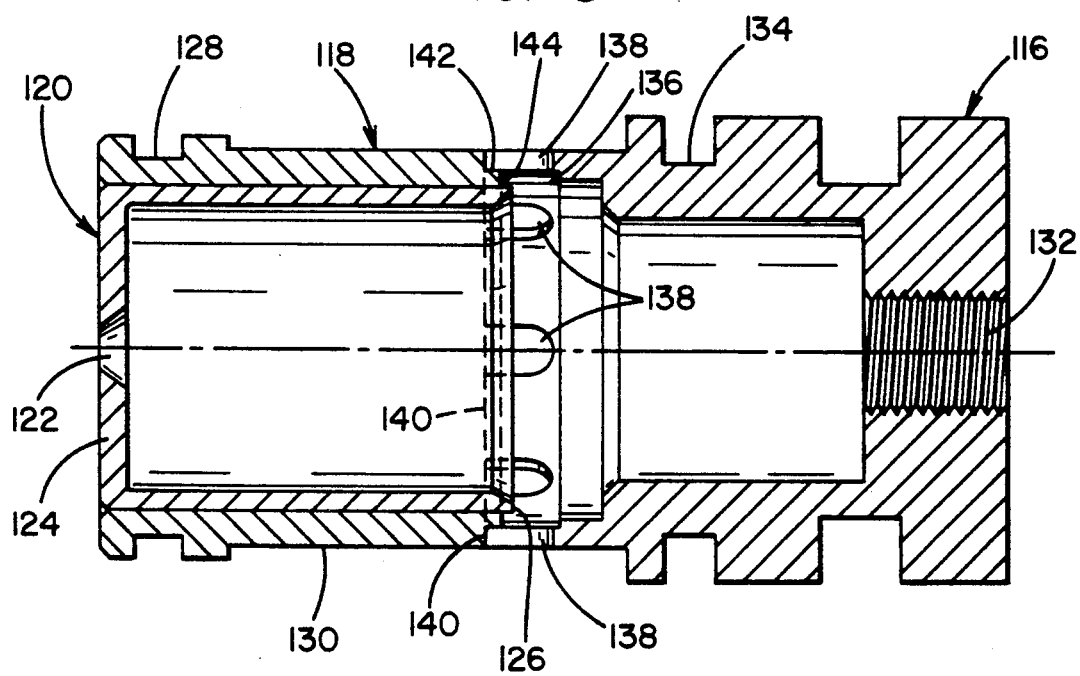

More particularly with regard to the cylinder assembly modification, and with reference to FIGS. 7 and 8 of the drawing, it will be seen that the cylinder assembly is comprised of coaxial bonnet and sleeve members 116 and 118, respectively, and that sleeve 118 receives cup-shaped piston 120 having an orifice 122 through outer end wall 124 thereof and having an inner edge 126 for controlling the flow through the outlet passageway of the cylinder assembly in response to reciprocation of the valve in sleeve 118. Sleeve 118 has an uninterrupted inner surface and has a recess 128 in the outer surface at one end thereof to receive an O-ring seal corresponding to seal 38 in the embodiments described hereinabove, and a radially inwardly stepped outer surface portion 130 for the purpose set forth herein with respect to surface 36 of sleeve 20. Bonnet 116 is basically of the same structure as bonnet 22 and, in this respect includes an internally threaded opening 132 in the outer end thereof to receive a spring adjusting screw and a peripheral groove 134 toward the axially inner end thereof to receive an O-ring seal corresponding to seal 40 in the embodiments described hereinabove. The axially inner end of bonnet 116 is provided internally with a peripheral recess 136 and a plurality of U-shaped ports 138 having axially inner ends which terminate at inner end edge 140 of the bonnet. Preferably, to assure retention of the coaxial relationship between bonnet 116 and sleeve 118, the axially inner end of sleeve 118 is provided with a circumferential recess 142 which receives the axially inner end of bonnet 116. Accordingly, the outlet ports are defined by the U-shaped recesses 138 in bonnet 116 and the portions of inner edge 144 of sleeve 118 spanning the recesses. By providing recesses in the axially inner end of the bonnet to provide the outlet ports from the cylinder assembly, it will be appreciated that the outlet ports can be of a variety of shapes such as round, axially or circumferentially elongated, square, or the like.

While considerable emphasis has been placed herein on the structures and structural interrelationship between the component parts of the preferred embodiments of the present invention, it will be appreciated that many embodiments of the invention can be made and that many changes can be made in the embodiments disclosed herein, whereby it is to be distinctly understood that the foregoing descriptive matter is to be interpreted merely as illustrative of the invention and not as a limitation.

Having thus described the invention it is claimed:

1. A flow regulating valve for maintaining a desired flow rate for a liquid in a post-mix beverage dispenser comprising cylinder means having axially opposite first and second end means and radial outlet means spaced from said first end means, piston means axially slidable in said cylinder means and having outer and inner end means, said outer end means being adjacent said first end means of said cylinder means, means including orifice means opening through said outer end means of said piston means to provide an inlet for liquid to flow through said cylinder means to said outlet port means, said piston means being displaceable in said cylinder means from a first toward a second position by liquid under pressure flowing through said orifice means into said cylinder means, said piston means in moving from said first toward said second position controlling the flow of said liquid through said outlet means to maintain a predetermined flow rate of said liquid through said valve, and first and second selectively adjustable means for changing said predetermined flow rate.

2. The valve according to claim 1, wherein said first and second selectively adjustable means includes adjustable spring means biasing said piston means toward said first position thereof, and means for adjusting the area of said orifice means.

3. The valve according to claim 2, wherein said means for adjusting the area of said orifice means includes pin means mounted on said second end means of said cylinder means and having end means in said cylinder means coaxial with said orifice means, and means mounting said pin means on said second end means for displacing said end means of said pin means axially toward and away from said orifice means.

4. The valve according to claim 2, wherein said adjustable spring means includes adjusting member means mounted on said second end means of said cylinder means for displacement axially toward and away from said first end means of said cylinder means, said adjusting member means having an end in said cylinder means including spring abutment means axially displaceable therewith, and compression spring means between said abutment means and said piston means.

5. The valve according to claim 4, wherein said adjusting member means is tubular and coaxial with said orifice means and said means for adjusting the area of said orifice means includes pin means supported in said tubular adjusting member means for axial displacement relative thereto toward and away from said orifice means, said pin means having end means in said cylinder means coaxial with said orifice means for adjusting the area thereof in response to said axial displacement of said pin means.

6. The valve according to claim 5, wherein said tubular adjusting member means is externally threaded and threadedly interengaged with an opening therefor in said second end means of said cylinder means to provide for said axial displacement of said adjusting member means.

7. The valve according to claim 6, wherein said tubular adjusting member means is internally threaded and said pin mean is externally threaded to provide for said axial displacement of said pin means.

8. A flow regulating valve for maintaining a desired flow rate for a liquid in a post-mix beverage dispenser comprising cylinder means having axially opposite first and second end means and radial outlet means spaced from said first end means, piston means axially slidable in said cylinder means and having outer and inner end means, said outer end means being adjacent said first end means of said cylinder means, means including orifice means opening through said outer end means of said piston means to provide an inlet for liquid to flow through said cylinder means to said outlet port means, said piston means being displaceable in said cylinder means from a first toward a second position by liquid under pressure flowing through said orifice means into said cylinder means, said piston means in moving from said first toward said second position controlling the flow of said liquid through said outlet means to maintain a predetermined flow rate of said liquid through said valve, and first and second adjustable means for changing said predetermined flow rate, said first and second adjustable means including adjustable spring means biasing said piston means toward said first position thereof, and means for adjusting the area of said orifice means, said orifice means including orifice plate means, means providing said orifice plate means with an orifice therethrough expandable from a first area to a second area, and said means for adjusting the area of said orifice means including means in said cylinder means selectively engagable with said orifice plate means to expand said orifice from said first to said second area.

9. The valve according to clam 8 wherein said adjustable spring means includes adjusting member means mounted on said second end means of said cylinder means for displacement axially toward and away from said first end means of said cylinder means, said adjusting member means having an end in said cylinder means including spring abutment means axially displaceable therewith, and first compression spring means between said abutment means and said piston means.

10. The valve according to claim 9, wherein said orifice plate means is of resilient material and said means selectively engagable with said orifice plate means includes orifice expanding member means coaxial with said orifice and axially displaceable relative to said orifice plate means between first and second positions, said orifice expanding member means in said first position engaging said orifice plate means to expand said orifice from said first to said second area and in said second position disengaging said orifice plate means whereby said said orifice returns to said first area, and means for selectively displacing said orifice expanding member means between said first and second positions.

11. The valve according to claim 10, wherein said means for selectively displacing said orifice expanding member means includes second spring means in said cylinder means between said abutment means and said orifice expanding member means.

12. The valve according to claim 11, wherein said orifice plate means is of sheet metal and said expandable orifice includes an opening therethrough and a plurality of radial slits extending from said opening and deflectable axially thereof to expand the area of said opening.

13. The valve according to claim 1, wherein said first and second adjustable means includes adjusting member means mounted on said second end means of said cylinder means for displacement axially toward and away from said first end means of said cylinder means, said adjusting member means having an end in said cylinder means including spring abutment means axially displaceable therewith, first and second compression spring means between said abutment means and said piston means, said adjusting member means having a selectable first position in which said first spring means is in compression between said abutment means and said piston means to bias said piston means toward said first position thereof, said second compression spring means being uncompressed in said first position of said adjusting member means, and said adjusting member means having a selectable second position in which both said first and second spring means are in compression between said abutment means and said piston means to bias said piston means toward said first position thereof.

14. The valve according to claim 13, wherein said adjusting member means is threadedly interengaged with said second end means of said cylinder means to provide for said axial displacement of said adjusting member means.

15. The valve according to claim 13, wherein said first and second compression spring means are coaxial in said cylinder means.

16. The valve according to claim 15, and spring guide means in said cylinder means cooperable with said spring abutment means to maintain said first and second compression spring mean coaxial.

17. The valve according to claim 16, wherein said spring abutment means includes radially inner and outer spring abutment shoulders and said spring guide means includes tubular sleeve means engaging said piston means, one of said first and second compression spring means having opposite ends respectively engaging said inner spring abutment shoulder and received in said tubular sleeve means, and the other of said first and second compression spring means having opposite ends respectively engaging said outer spring abutment shoulder and surrounding said tubular sleeve means.

18. The valve according to claim 17, wherein said one compression spring means is said second compression spring means.

19. The valve according to claim 18, wherein said first and second compression spring means are coaxial in said cylinder means.

20. The valve according to claim 1, wherein said cylinder means includes axially abutting coaxial sleeve means and bonnet means, said plate means being slidable in said sleeve means and said inner end means of said piston means including edge means adjacent the juncture between said sleeve means and bonnet means when said piston means is in said first position thereof, and said outlet means including radial openings through said bonnet means adjacent said juncture.

21. The valve according to claim 20, wherein said sleeve means and said bonnet means have abutting edges at said juncture, and said radial openings are defined by recesses extending axially into said bonnet means from the edge thereof and the edge of said sleeve means facing said recess.

22. A flow regulating valve for maintaining a desired flow rate for a liquid in a post-mix beverage dispenser comprising cylinder means having an axis and axially opposite first and second ends, said first end being open and said second end including end wall means, said cylinder means including radial outlet means between said first and second ends, a piston reciprocable in said cylinder means and having an outer end wall transverse to said axis and adjacent said first end of said cylinder means and a skirt portion having inner edge means adjacent said outlet port means for controlling the flow of liquid though said outlet means in response to reciprocation of said piston in said cylinder means, said outer end wall having an orifice therethrough coaxial with said axis and providing an inlet for the flow of liquid into said cylinder means, spring means in said cylinder means biasing said piston toward said first end, means for adjusting the biasing force of said spring means against said piston, pin means extending inwardly of said cylinder means from said end wall means thereof coaxial with said axis and having an inner end facing said orifice, and means supporting said pin means on said end wall means for axially adjusting the position of said inner end relative to said orifice and independent of the adjustment of said biasing force to selectively vary the area of said orifice.

23. The valve according to clam 22, wherein said orifice and said inner end of said pin means diverge axially inwardly of said cylinder means.

24. The valve according to claim 22, wherein said means for adjusting the bias of said spring means includes externally threaded adjusting screw means extending through said end wall means of said cylinder means in threaded engagement with a threaded opening therefor in said end wall means, said adjusting screw means providing said means supporting said pin means on said end wall means.

25. The valve according to claim 24, wherein said adjusting screw means is tubular and internally threaded and said pin means includes an externally threaded portion extending through said adjusting screw means in threaded engagement therewith.

26. The valve according to claim 25, wherein said orifice and said inner end of said pin means diverge axially inwardly of said cylinder means.

27. A flow regulating valve for maintaining a desired flow rate for a liquid in a post-mix beverage dispenser comprising cylinder means having an axis and axially opposite first and second ends, said first end being open and said second end including end wall means, said cylinder means including radial outlet means between said first and second ends, a piston reciprocable in said cylinder means and having outer end wall means transverse to said axis and adjacent said first end of said cylinder means and a skirt portion having inner edge means adjacent said outlet means for controlling the flow of liquid though said outlet means in response to reciprocation of said piston in said cylinder means, means providing said outer end wall means with orifice means therethrough coaxial with said axis and providing an inlet for the flow of liquid into said cylinder means, first and second compression springs in said cylinder means for biasing said piston toward said first end, and spring adjusting means for selectively biasing said piston toward said first end with just said first spring or with both said first and second springs, said spring adjusting means having a first axial position spaced from said piston and a second axial position closer to said piston than said first position, said first spring in said first position being compressed between said piston and said spring adjusting means to bias said piston toward said first end, said second spring in said first position being uncompressed, and both said first and second springs in said second position being compressed between said piston and said spring adjusting means to bias said piston toward said first end.

28. The valve according to claim 27, wherein said first and second springs are coaxial, and means including said spring adjusting means supporting said first and second springs in coaxial relationship.

29. The valve according to claim 28, wherein said spring adjusting means extends through said end wall means of said cylinder means and includes spring abutment means in said cylinder means, said spring abutment means having axially stepped first and second coaxial nodes respectively providing radially outer and inner spring abutment shoulders, one of said first and second springs having a first end surrounding said first node and engaging said outer shoulder, and the other of said first and second springs having a first end surrounding said second node and engaging said inner shoulder.

30. The valve according to claim 29, and guide sleeve means in said cylinder means adjacent said outer end wall means of said piston and coaxial with said axis, said one spring having a second end surrounding said guide sleeve means and said other spring having a second end extending into said guide sleeve means.

31. The valve according to claim 30, wherein said guide sleeve means includes radial flange means abutting said outer end wall means of said piston, one of said first and second springs engaging said flange means in said first position of said spring adjusting means to bias said piston toward said first end of said cylinder means, and the other of said first and second springs in said first position being axially spaced from said outer end wall means of said piston.

32. The valve according to claim 31, wherein said one spring is said first spring.

33. A flow regulating valve for maintaining a desired flow rate for a liquid in a post-mix beverage dispenser comprising cylinder means having an axis and axially opposite first and second ends, said first end being open and said second end including end wall means, said cylinder means including radial outlet means between said first and second ends, a piston reciprocable in said cylinder means and having outer end wall means transverse to said axis and adjacent said first end of said cylinder means and a skirt portion having inner edge means adjacent said outlet means for controlling the flow of liquid though said outlet means in response to reciprocation of said piston in said cylinder means, means providing said outer end wall means with orifice means therethrough coaxial with said axis and providing an inlet for the flow of liquid into said cylinder means, first and second compression springs in said cylinder means for biasing said piston toward said first end, and spring adjusting means for selectively biasing said piston toward said first end with just said first spring or with both said first and second springs, said means providing said outer end wall means with orifice means including resilient orifice plate means transverse to said axis, means including deflectable means providing an expandable opening therethrough, said opening having a first area when said spring adjusting means provides for biasing said piston with just said first spring, and means cooperable with said second spring to deflect said deflectable means to expand said opening to a second area when said spring adjusting means provides for biasing said piston with both said first and second springs.

34. The valve according to claim 33, wherein said expandable opening is defined by an aperture through said orifice plate means having said first area and a plurality of fingers extending radially from said aperture and providing said deflectable means.

35. The valve according to claim 34, wherein said means cooperable with said second spring includes axially displaceable deflector member means axially engaging against said fingers under the bias of said second spring to deflect said fingers axially outwardly of said first end of said cylinder means to expand said aperture to said second area.

36. The valve according to claim 35, wherein said deflector member means includes annular sleeve means coaxial with said aperture and including annular rib means engaging said fingers, and means to maintain said sleeve means coaxial with said aperture during axial displacement of said deflector means.

37. The valve according to claim 35, wherein said spring adjusting means has a first axial position spaced from said piston and a second axial position closer to said piston than said first position, said first spring in said first position being compressed between said piston and said spring adjusting means to bias said piston toward said first end, said second spring in said first position being uncompressed, said deflector member means being between said second spring and said orifice plate means, and both said first and second springs in said second position being compressed between said piston and said spring adjusting means to bias said piston toward said first end and for said deflector member means to deflect said fingers to expand said aperture to said second area.

38. The valve according to claim 37, wherein said spring adjusting means extends through said end wall means of said cylinder means and includes spring abutment means in said cylinder means, said spring abutment means having axially stepped first and second coaxial nodes respectively providing radially outer and inner spring abutment shoulders, said first spring having a first end surrounding said first node and engaging said outer shoulder, said second spring having a first end surrounding said second node and engaging said inner shoulder, guide sleeve means in said cylinder means adjacent said outer end wall means of said piston and coaxial with said axis, said first spring having a second end surrounding said guide sleeve means, said second spring having a second end extending into said guide sleeve means, and said deflector member means being on said second end of said second spring and spaced from said orifice plate means in said first position of said spring adjusting means.

39. The valve according to claim 38, wherein said outer end wall means of said piston includes a radially inwardly extending peripheral wall, said orifice plate means engaging said peripheral wall, said guide sleeve means having a radially outwardly extending peripheral flange engaging said orifice plate means against said peripheral wall, and said second end of said first spring engaging said peripheral flange.

40. The valve according to claim 39, wherein said deflector member means includes an annular sleeve extending into said second end of said second spring and having an outer end facing said orifice plate means and provided with an annular rib for engaging and deflecting said fingers.

* * * * *